Oct. 12, 1965 S. ABRAMOVITZ ETAL 3,211,266

CLUTCH

Filed Oct. 4, 1963

INVENTORS.
STANLEY ABRAMOVITZ
JUSTIN CHERUBIM
VITO J. PIZZITOLA

BY Charles Marks
ATTORNEY

United States Patent Office 3,211,266
Patented Oct. 12, 1965

3,211,266
CLUTCH
Stanley Abramovitz, New York, Justin Cherubim, Wyandanch, and Vito J. Pizzitola, Deer Park, N.Y., assignors to Industrial Tectonics, Inc., Ann Arbor, Mich., a corporation of Michigan
Filed Oct. 4, 1963, Ser. No. 313,901
3 Claims. (Cl. 192—88)

This invention relates to disc clutches.

As is well known, in clutches of this kind, a disc-shaped or annular member, mounted upon a suitable driving shaft, is engageable with another disc-shaped or annular member, mounted upon a suitable driven shaft. However, in practice such clutches have encountered a variety of difficulties.

For example, upon engagement of the disc-shaped or annular members of such clutches, it often happens that an axial thrust of substantial proportions is communicated to the driven shaft, thereby imposing a load upon its bearings and necessitating the imposition of a substantial starting torque in order to activate the driven shaft. This condition is undesirable in that it adds to the power required for operation of the clutch and produces sluggishness in its operation.

Again, conventional clutches are frequently characterized by a substantial amount of backlash, which may cause the driven shaft to be correspondingly unresponsive to the motion of the driving shaft.

Such characteristics may interfere with the desired performance of a clutch where, as in computer mechanisms, for example, a sensitive and precise relation may have to be maintained between the rotation of the driving and driven shafts. Moreover, where the clutches are employed in miniature form, it has been found to be particularly difficult to remedy the above-noted difficulties. This is especially the case where complex mechanisms are sought to be employed to accomplish engagement and disengagement of the clutch faces.

One conventional attempt to solve some of these difficulties has involved the activation of the clutch faces by electromagnetic means such as an electric coil which induces engagement and disengagement of the clutch faces by means of a suitable electromagnetic field. However, where the clutch must operate in a high temperature region, the provision of such coils is often limited by the heat-resisting capacity of their insulation. Hence, electromagnetic clutches of this type have heretofore enjoyed only a limited application.

The present invention is intended for the solution of these problems. More specifically, it is an object of the present invention to provide an improved disc clutch whose driven shaft requires a minimum of starting torque.

Another object of the invention is to provide a disc clutch which is characterized by an absence of any substantial backlash.

Another object of the invention is to provide a disc clutch which is characterized by an absence of any sub-miniaturization.

A further object of the invention is to provide a disc clutch of the character described which has improved means for accomplishing clutch engagement and disengagement.

A further object of the invention is to provide a disc clutch of the character described which may be activated by the pressure of a fluid such as a liquid or a gas.

A still further object of the invention is to provide a disc clutch of the character described wherein an adjustable output torque is available.

Yet a further object of the invention is to provide a disc clutch which may be rapidly engaged and disengaged with a minimum of energy and whose driven member, when engaged, is highly responsive to the movement of its driving member.

Other objects and advantages of the present invention will become apparent from the following description as read in connection with the accompanying drawing.

In the drawing.

Throughout the several views, similar numerals are employed to refer to similar parts of the aforesaid embodiment of the invention.

The present invention makes use of a slight increase in the pressure of a fluid communicated to yieldable means so as to move a clutch plate into clutch engagement. Such engagement is maintained as long as the increased level of fluid pressure is maintained. However, upon a decrease in such pressure, a disengagement of the clutch is accomplished. This mode of operation can be understood more readily from the following discussion of the embodiment of the invention depicted in the accompanying drawing.

Figure 1:
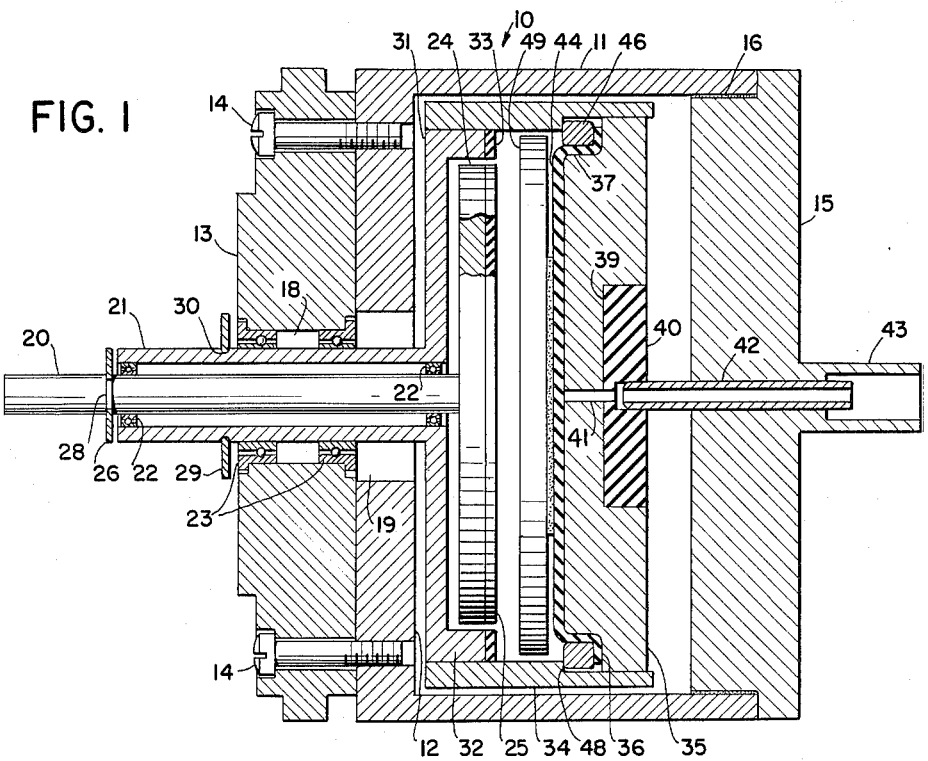
FIGURE 1 is a cross-sectional elevational view of one embodiment of the present invention wherein the operative parts of the clutch are depicted in a disengaged position.

Thus, as shown in FIGURE 1 of the drawing, one embodiment of the invention comprises a housing of conventional design, such housing being generally designated by the numeral 10 and including a casing 11 having at one of its ends a base 12 engaged with a base plate 13 by means of threaded members 14. The housing 10 also includes a closure member 15 secured to the other end of the casing 11 by conventional means such as a suitable epoxy adhesive 16, for example.

The base plate 13 is provided with a central aperture 18 which is coaxially aligned with a central aperture 19 formed in the base 12. A drive shaft 20 and a tubular driven shaft 21 disposed concentrically of the drive shaft 20 project outwardly from these apertures 18, 19 and inwardly thereof to the interior of the casing 11. The drive shaft 20 is rotatably supported by a pair of radial bearings 22 mounted within the tubular driven shaft 21; and the latter is rotatably supported by a pair of radial bearings 23 mounted within the central aperture of the base plate 13.

The inner end of the drive shaft 20 terminates in a radially extending element such as a flange 24 which is hereinafter referred to as the drive flange and is provided with a facing 25 composed of cork or other material having similar gripping characteristics, such as soft rubber, for example. The other end of the drive shaft 20 protrudes from within the driven shaft 21 and is provided with a suitable snap-ring 26 engaged in the conventional manner with a groove formed upon the periphery of the drive shaft 20. A similar snap-ring 29 is also engaged in the conventional manner with a groove 30 formed upon the external periphery of the driven shaft 21.

The inner end of the driven shaft 21 also terminates in a radially extending element such as a flange 31 which is hereinafter referred to as the driven flange and is disposed between the drive flange 24 and the base 12. The driven flange 31 is provided with an annular lip 32 having a facing 33 composed of a material similar to that of the facing 25; and the exposed surfaces of these facings 25, 33 are aligned in the same plane.

The above-described disposition of the drive and driven shafts 20, 21 is maintained by the snap-rings 26, 29, as well as by the base 12 and driven flange 31. Thus, the driven flange 31 obstructs any tendency of the drive flange 24 to move outwardly of the housing 10; and any similar tendency on the part of the driven flange 31 is obstructed by the base 12. Moreover, any tendency of the drive shaft 20 and driven shaft 21 to move inwardly of the housing 10 is obstructed by the snap-ring 29 which is abuttable against the base plate 13. In addition, the snap-ring 26 is abuttable against the outer end of the driven shaft 21 so as to obstruct axial displacement of the drive shaft 20 with respect to the driven shaft 21.

An important feature of the invention resides in the means for accomplishing engagement of the clutch so as to transmit rotary motion from the drive shaft 20 to the driven shaft 21. This feature may be best understood from the following description:

Thus, as may be seen in FIGURE 1 of the drawing, the annular lip 32 is engaged with one end of a tubular member 34. The opposite end of said tubular member 34 is engaged with a cover 35 having a shoulder 36 formed adjacent to the perimetric periphery 37 of a boss 38 provided upon the inner side of the cover 35. The shoulder 36 and boss 38 are preferably of circular conformation.

The outer surface of the cover 35 is also provided with a cavity 39 in which a block 40 is frictionally secured, the said block 40 being formed of a bearing material composed of plastic, metal or other substance. In this block 40, there is an axial aperture 41 which extends through the boss 38 and communicates with a tubular needle 42 journalled in the block 40. The needle 42 is also engaged with the closure member 15 and extends therethrough into a nipple 43 provided upon said closure member 15.

Important to the accomplishment of clutch engagement is a yieldable means which is responsive to fluid pressures communicable through the needle 42. This yieldable means is preferably in the form of a diaphragm 44, composed of rubber or other elastomeric material, which is seated upon and covers the boss 38. The diaphragm 44 is maintained in frictional engagement with the perimetric periphery 37 of the boss 38 and the shoulder 36 by means of a ring 46 which surrounds the boss 38 and is in tight contact with the outer surface of the diaphragm 44. The ring 46 is also seated upon a shoulder 48 formed on the internal periphery of the tubular member 34. The shoulder 48 maintains the ring 46 against displacement from its aforesaid contact with the diaphragm 44.

As may also be seen in FIGURE 1, a circular clutch plate 49 is secured to the diaphragm 44 by means of a suitable adhesive 50; and the clutch plate 49 is also disposed in spaced relation with respect to the facings 25 and 33 of the drive and driven flanges.

Figure 2:
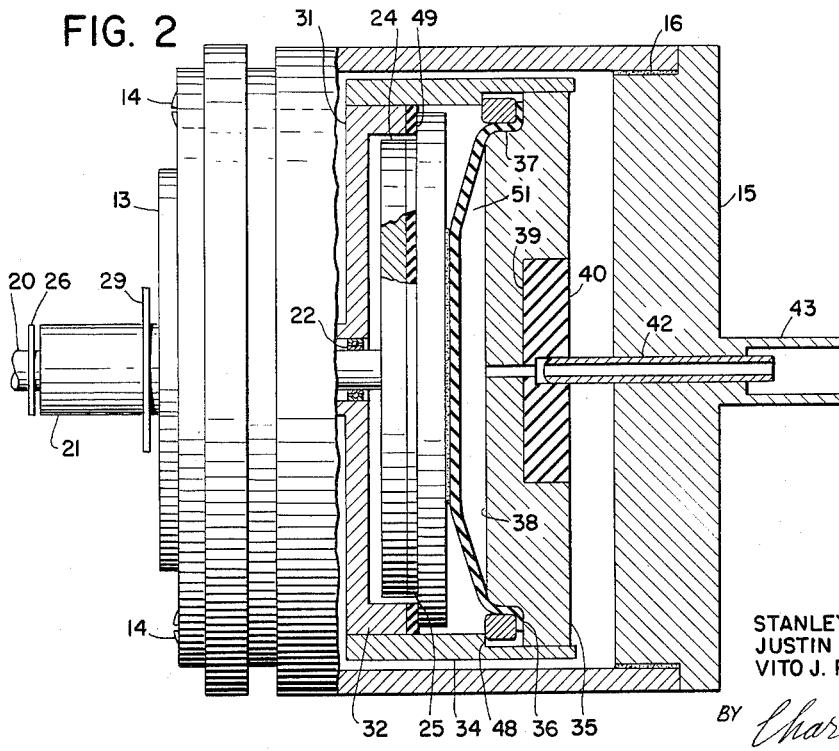
FIGURE 2 is a partially cross-sectioned elevational view of the said embodiment of the present invention showing the operative parts of the clutch in their engaged position.

This position represents the disengaged position of the clutch whereby the drive shaft 20 may rotate without accomplishing any rotary motion of the driven shaft 21. To effectuate engagement of the clutch and the consequent transmission of rotary motion from the drive shaft 20 to the driven shaft 21, it is necessary to bring the clutch plate 49 into simultaneous contact with the facings 25 and 33. This is advantageously accomplished in the above-described device in the following manner:

Thus, it will be seen that a fluid such as air, water, oil or the like may be introduced from a suitable source thereof into the nipple 43 and the needle 42 so as to flow through the aperture 41 and exert a pressure upon the diaphragm 44. Such pressure will urge the diaphragm 44 axially into contact with the facings 25 and 33. This position represents the engaged position of the clutch and is depicted in FIGURE 2 of the drawing.

As will be seen in this figure, when the diaphragm 44 has been displaced so as to accomplish such clutch engagement, a chamber 51 is formed for the reception of the fluid introduced through the aperture 41, the chamber being defined by the diaphragm 44 and the boss 38.

It will be observed that the pressure of any fluid within the chamber 51 will be exerted upon the boss 38 as well as upon the diaphragm 44. In the above described form of the invention, the aperture is made so as to have an extremely small diameter with the consequence that its cross-sectional area is minute in comparison with the surface area of the face of the boss 38. Hence, the surface area of the diaphragm 44 subjected to the pressure of the fluid in the chamber 51 is substantially equal to the surface area of the boss 38 which is subjected to such pressure. In view of this substantial equality in the surfaces of the chamber 51 subjected to fluid pressure, it will be seen that there will be a minimum of axial thrust communicated to the bearings 23 since the total force communicated to the diaphragm 44 will be substantially equal and opposite to that communicated to the boss 38. Moreover, since the clutch plate 49 will exert substantially the same pressure upon each of the facings 25, 33, substantially no axial thrust will be exerted upon the bearings 22.

Of course, it is to be understood that while the bearings 22, 23 have been referred to as "radial bearings," they are capable of withstanding a slight amount of axial thrust such as might arise by reason of any minute inequality between the areas of the opposing surfaces of the chamber 51 or their non-parallel disposition during the engaged position of the clutch, or by reason of any slight misalignments of the facings 25, 33, clutch plate 49 and the like.

It will be seen from the foregoing, then, that when the clutch plate 49 is engaged with the facings 25, 33, any rotary movement of the drive shaft 20 will be transmitted to the driven shaft 21 and to the tubular member 34. At the same time, the clutch plate 49, diaphragm 44, cover 35, ring 46 and block 40 will be rotated by the drive shaft 20; and such movement will be accomplished without the necessity of overcoming any substantial starting torque which might otherwise be present if a substantial axial thrust were imposed upon the bearings 22, 23.

The above described engagement of the clutch, as well as its disengagement, may be accomplished by suitable variation of the pressure of the fluid introduced through the aperture 41, such variation being attainable by conventional means; and, since such pressure variation may be transmitted at great speed through the fluid, the engagement and disengagement of the clutch may be accomplished with corresponding rapidity. Moreover, once the clutch plate 49 is engaged with the facings 25, 33 backlash or slippage will be minimized.

It will also be seen that by varying the pressure of the fluid introduced by way of the aperture 41, it will be possible to vary the pressure exerted by the clutch plate 49 upon the facings 25, 33, thereby accomplishing a corresponding variation in the torque transmissible from the drive shaft 20 to the driven shaft 21.

It will also be seen that since the block 40 is composed of a material having a low coefficient of friction, the rotation to which it will be subject upon clutch engagement will produce no adverse effects upon the tubular needle 42 which is secured in a non-rotating position in the closure member 15. Moreover, in addition to serving as a means for introducing the aforesaid fluid to the aperture 41 and chamber 51, the needle 42 may, if desired, serve to support against radial displacement the block 40, cover 35, tubular member 34 and the remaining rotatable structures therein.

While the above described form of the invention has included concentric drive and driven shafts which project from the same end of the housing, it is to be understood that the principle of the present invention may be employed with mechanisms where the drive and driven shafts are not concentric or in mechanisms wherein they do not project from the same end thereof.

It is also noteworthy that the various parts employed in the above described form of the invention are of simple design and may be formed by conventional means; and since there are a minimum of such parts, this form of the invention is adaptable to miniaturization and lightweight construction.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

We claim:

1. In a clutch provided with a housing for a rotatable drive shaft and a rotatable driven shaft disposed concentrically of said drive shaft, the combination comprising:
    (a) a rotatable tubular member engaged with a driven flange depending from said rotatable driven shaft;
    (b) said driven flange being provided with an annular lip surrounding a drive flange depending from said rotatable drive shaft;
    (c) a cover engaged with said rotatable tubular member;
    (d) said cover including a boss engaged with a diaphragm secured to said boss by a ring;
    (e) said ring being frictionally engaged with a portion of the diaphragm which covers the perimetric periphery of the boss;
    (f) said ring being seated between a shoulder formed upon the internal periphery of said rotatable tubular member and a shoulder formed upon said cover;
    (g) said diaphragm being adhesively engaged with a clutch plate;
    (h) said cover being provided with an aperture communicating between said diaphragm and a source of fluid;
    (i) said diaphragm being displaceable by said fluid when pressure is exerted thereon, thereby urging said clutch plate into engagement with said drive flange and said annular lip, whereby torque is transmissible from said rotatable drive shaft to said rotatable driven shaft.

2. In a clutch provided with a housing for a rotatable drive shaft and a rotatable driven shaft disposed concentrically of said drive shaft, the combination comprising:
    (a) a rotatable tubular member engaged with a driven flange depending from said rotatable driven shaft;
    (b) said driven flange being provided with an annular lip disposed concentrically of a drive flange depending from said rotatable drive shaft;
    (c) a cover engaged with said rotatable tubular member;
    (d) said cover including a circular boss engaged with a diaphragm secured to said circular boss by an annular ring;
    (e) said annular ring being seated between a shoulder formed upon the internal periphery of said rotatable tubular member and a shoulder formed upon said cover;
    (f) said diaphragm being affixed to a clutch plate by an adhesive;
    (g) said cover being provided with a radially extending block and an axial aperture extending through the cover and radially extending block;
    (h) said axial aperture communicating with a tubular needle affixed to a closure member engaged with the housing;
    (i) said tubular needle communicating with a source of fluid under pressure;
    (j) said fluid being contactable with said diaphragm to urge it into spaced relation with respect to the face of said circular boss, thereby forming a chamber for the reception of said fluid between said diaphragm and said circular boss;
    (k) the clutch plate being urged into engagement with said annular lip and drive flange when said diaphragm is urged into spaced relation with respect to the face of said circular boss, whereby torque is transmissible from said rotatable drive shaft to said rotatable driven shaft.

3. In a clutch provided with a housing for a rotatable drive shaft and a rotatable driven shaft disposed concentrically of said drive shaft, the combination comprising:
    (a) a rotatable tubular member engaged with a driven flange depending from said rotatable driven shaft;
    (b) said driven flange being provided with an annular lip disposed concentrically of a drive flange depending from said rotatable drive shaft;
    (c) a cover engaged with said rotatable tubular member and disposed oppositely of said drive and driven flanges;
    (d) said cover including a circular boss engaged with a rubber diaphragm;
    (e) an annular ring surrounding the circumferential periphery of said circular boss and contacting said rubber diaphragm, whereby said rubber diaphragm is secured to the circumferential periphery of said circular boss;
    (f) said annular ring being seated between a shoulder form upon the internal periphery of said rotatable tubular member and a shoulder formed upon said cover;
    (g) said rubber diaphragm being affixed to a circular clutch plate by an adhesive;
    (h) said cover being formed with a cavity which houses a radially extending block;
    (i) an axial aperture extending through the cover and radially extending block;
    (j) said axial aperture communicating with a tubular needle journalled in the radially extending block and affixed to a closure member engaged with the housing;
    (k) said tubular needle communicating with a source of fluid under pressure;
    (l) said fluid being contactable with said diaphragm to urge it into spaced relation with respect to the face of the circular boss, thereby forming a chamber for the reception of said fluid between said diaphragm and said circular boss;
    (m) the clutch plate being urged into engagement with said annular lip and drive flange when said diaphragm is urged into spaced relation with respect to the face of said circular boss, whereby torque is transmissible from said rotatable drive shaft to said rotatable driven shaft;
    (n) said tubular needle supporting said radially extending block, cover and rotatable tubular member against axial displacement when said torque is transmitted from said rotatable drive shaft to said rotatable driven shaft.

References Cited by the Examiner
UNITED STATES PATENTS

| | | | |
|---|---|---|---|
| 2,138,393 | 11/38 | Wichtendahl | 192—88 |
| 2,551,761 | 5/51 | Peterson | 192—88 |
| 2,621,768 | 12/52 | Cardwell et al. | 192—88 |

DON A. WAITE, *Primary Examiner.*